(12) United States Patent
Bayramian et al.

(10) Patent No.: US 12,088,055 B2
(45) Date of Patent: Sep. 10, 2024

(54) FLUID EDGE CLADDING FOR SPECTROSCOPIC ABSORPTION OF LASER EMISSIONS AND AMPLIFIED SPONTANEOUS EMISSION

(71) Applicant: Seurat Technologies, Inc., Mountain View, CA (US)

(72) Inventors: Andrew J. Bayramian, Marblehead, MA (US); James A. DeMuth, Woburn, MA (US)

(73) Assignee: Seurat Technologies, Inc., Wilmington, MA (US)

( * ) Notice: Subject to any disclaimer, the term of this patent is extended or adjusted under 35 U.S.C. 154(b) by 335 days.

(21) Appl. No.: 17/225,971

(22) Filed: Apr. 8, 2021

(65) Prior Publication Data

US 2021/0320470 A1 Oct. 14, 2021

Related U.S. Application Data

(60) Provisional application No. 63/008,444, filed on Apr. 10, 2020.

(51) Int. Cl.
| | |
|---|---|
| *H01S 3/04* | (2006.01) |
| *H01S 3/042* | (2006.01) |
| *H01S 3/06* | (2006.01) |
| *H01S 3/16* | (2006.01) |

(52) U.S. Cl.
CPC ............ *H01S 3/0407* (2013.01); *H01S 3/042* (2013.01); *H01S 3/0606* (2013.01); *H01S 3/061* (2013.01); *H01S 3/1611* (2013.01); *H01S 3/1643* (2013.01); *H01S 3/1653* (2013.01)

(58) Field of Classification Search
CPC ...... H01S 3/0407; H01S 3/0606; H01S 3/061; H01S 3/1611; H01S 3/1643; H01S 3/1653; H01S 3/04; H01S 3/0402
See application file for complete search history.

(56) References Cited

U.S. PATENT DOCUMENTS

| | | | | |
|---|---|---|---|---|
| 3,356,966 A * | 12/1967 | Koester | ................... | H01S 3/042 372/72 |
| 3,421,096 A * | 1/1969 | Koester | ................... | H01S 3/093 330/56 |
| 4,858,243 A * | 8/1989 | Bar-Joseph | ............. | H01S 3/042 372/80 |
| 9,525,262 B2 * | 12/2016 | Stuart | ................... | H01S 3/1636 |
| 2003/0161375 A1 * | 8/2003 | Filgas | ................. | B23K 26/361 372/66 |
| 2013/0272336 A1 * | 10/2013 | Bayramian | ........... | H01S 3/0612 372/72 |
| 2021/0316502 A1 * | 10/2021 | Bayramian | .......... | B23K 26/146 |

* cited by examiner

*Primary Examiner* — Michael Carter
(74) *Attorney, Agent, or Firm* — David R. Stevens; Stevens Law Group (57) ABSTRACT

In one embodiment a laser amplifier includes a light pump source that can generate light at a first wavelength or range of wavelengths. The laser amplifier further includes an optically pumped laser amplifier having a gain medium that amplifies light at a second wavelength or range of wavelengths in response to receiving generated light from the light pump source. A housing is used to at least partially surround the gain medium and hold a coolant fluid able to absorb the second wavelength or range of wavelengths.

19 Claims, 6 Drawing Sheets

FLUID EDGE CLADDING FOR SPECTROSCOPIC ABSORPTION OF LASER EMISSIONS AND AMPLIFIED SPONTANEOUS EMISSION

CROSS-REFERENCE TO RELATED PATENT APPLICATION

The present disclosure is part of a non-provisional patent application claiming the priority benefit of U.S. Patent Application No. 63/008,444, filed on Apr. 10, 2020, which is incorporated by reference in its entirety.

TECHNICAL FIELD

The present disclosure generally relates to cooling high power lasers and, more particularly, to fluid cooling systems able to absorb amplified spontaneous emission of laser light.

BACKGROUND

High energy and high power lasers amplifiers can be used to provide or store energy for a laser system, as well as allow for aperture scaling to avoid laser damage of the substrate and/or optical coatings. However, as amplifier size increases, problems associated with unwanted lasing phenomenon such as amplified spontaneous emission (ASE) can occur. ASE occurs when spontaneously emitted photons traverse a laser gain medium and are amplified before they exit the gain medium in a transverse direction (i.e. a direction along which the laser beam does not propagate). ASE is favored when there is a combination of high gain and a long path for the spontaneously emitted photons. In effect, ASE depopulates the upper energy level in an excited laser gain medium and robs the laser of its power. Furthermore, reflection of ASE photons at gain medium boundaries may provide feedback for parasitic oscillations that further increase loss of laser power. In certain situations, ASE may even become large enough to deplete the upper level inversion in high-gain laser amplifiers.

To reduce ASE associated issues, a common practice is to have a material which absorbs at the ASE laser wavelength mounted on all sides of the gain medium where the laser does not have to transmit. This material is often referred to as edge-cladding or absorber-cladding. For example, a Nd laser operating around 1.06 micrometer wavelength can be clad with a material including divalent cobalt and divalent samarium ions.

In addition to problems with ASE or parasitic lasing, large amplifiers generate substantial waste heat. Unless removed, this waste heat can be deposited into the gain medium where it can be responsible for thermal lensing, mechanical stresses, depolarization, degradation of beam quality (BQ), loss of laser power, or thermal fracture. To reduce such heating problems, amplifiers have commonly been cooled using flow tubes that circulate a cooling gas or fluid around the amplifier gain medium. In some embodiments, the flow tube can be doped with ASE absorber ions to provide edge or absorber cladding functionality. However, as the average power of the amplifiers is increased, thermal loading on these flow tube edge/absorber cladding materials also increases, potentially resulting in thermal fracture. Since such ASE absorber flow tubes contain the coolant, flow tube fracture is catastrophic and can lead to destruction of the flashlamps, diode sources, or the amplifier gain medium (e.g. an amplifier rod). Systems that minimize ASE effects, while still allowing for easy cooling and replacement of the amplifier gain medium are needed.

SUMMARY

In one embodiment a laser amplifier includes a light pump source that can generate light at a first wavelength or range of wavelengths. The laser amplifier further includes an optically pumped laser amplifier having a gain medium that amplifies light at a second wavelength or range of wavelengths in response to receiving generated light from the light pump source. A housing is used to at least partially surround the gain medium and hold a coolant fluid able to absorb the second wavelength or range of wavelengths.

In one embodiment, the gain medium is a rod amplifier.

In one embodiment, the gain medium is a slab amplifier.

In one embodiment, the gain medium is a Nd:YAG rod and the coolant fluid can absorb 1064 nm laser emission.

In one embodiment, the gain medium is a Nd:YLF rod and the coolant fluid can absorb at least one of 1047 or 1053 nm laser emission.

In one embodiment, the coolant fluid transmits light at a first wavelength or range of wavelengths from the light pump source.

In one embodiment, wherein the coolant fluid comprises an aqueous salt solution.

In one embodiment, the coolant fluid comprises an aqueous salt solution with at least one of samarium chloride, samarium nitrate, samarium sulfate, copper nitrate, copper sulfate, or copper chloride.

In one embodiment, the housing is a flow tube.

In one embodiment, the housing is a flow tube doped to absorb light at the second wavelength or range of wavelengths.

In one embodiment, the housing and the gain medium together define a cavity able to hold the coolant fluid.

In one embodiment a laser amplifier includes a light pump source that can generate light at a first wavelength or range of wavelengths. An optically pumped laser amplifier having a gain medium that amplifies light at a second wavelength or range of wavelengths in response to receiving generated light from the light pump source is at least partially surrounded with a housing. The housing also at least partially surrounds the gain medium and holds a solid matrix that is able to absorb the second wavelength or range of wavelengths, with the solid matrix being cooled by a coolant fluid.

In one embodiment, the solid matrix defines a lattice structure doped with samarium or copper.

In one embodiment, the solid matrix comprises a bed of pebble shaped material doped with samarium or copper

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Figure 1A:
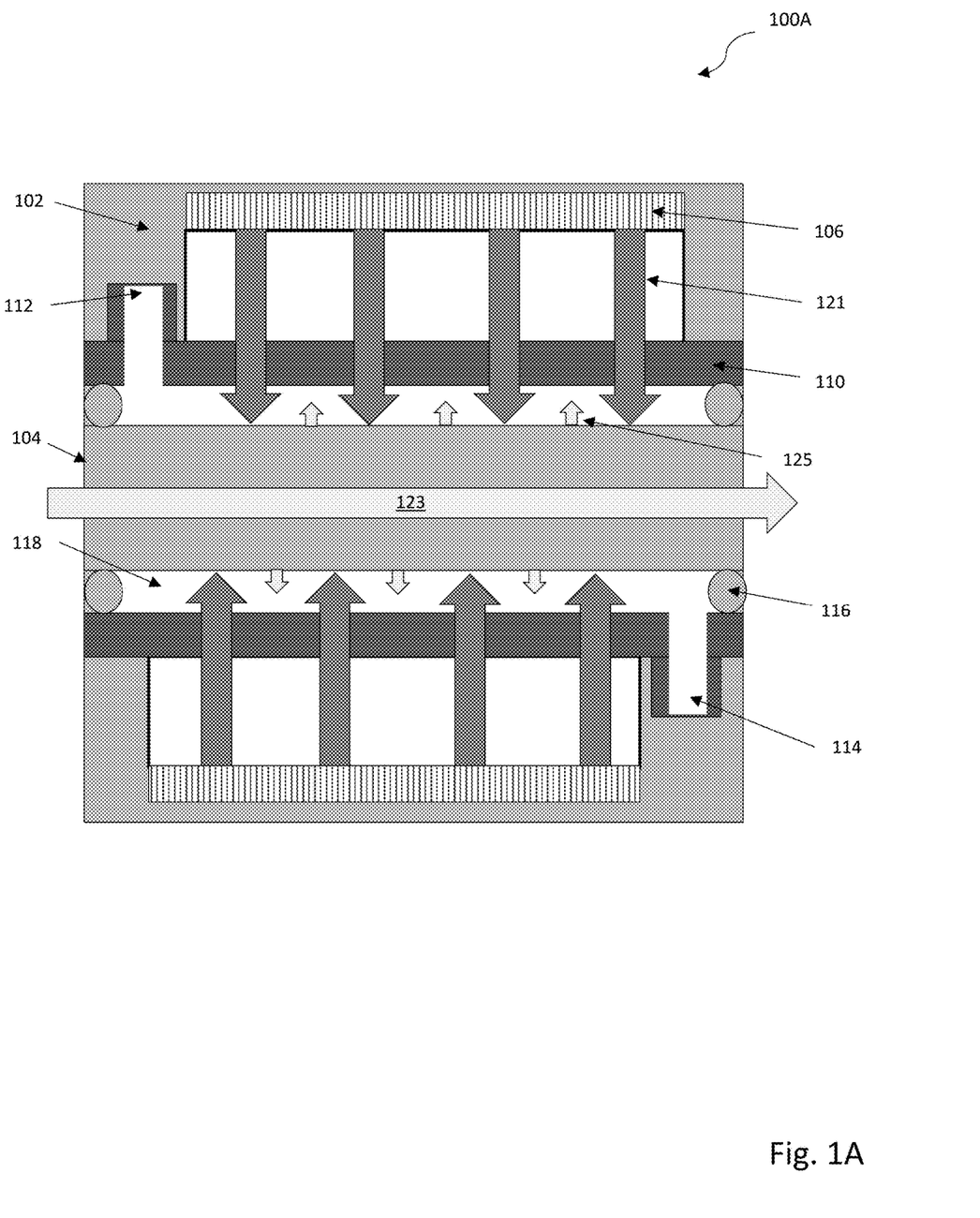
FIG. 1A illustrates a laser amplifier with a flow tube and a contained light absorbing solution.

FIG. 1A illustrates a laser cooling system 100A for a rod amplifier in cross-sectional view. The system 100A includes an amplifier housing 102 that at least partially surrounds a rod amplifier 104 to amplify incoming laser light using a light pump source 106. Immediately surrounding the rod amplifier 104 is a flow tube 110 having an inlet 112 and outlet 114, with fluid tight seals 116 being positioned to hold the rod amplifier 104. The flow tube can be filled with a recirculating fluid 118.

In operation, the light pump source 106 (which can be flashlamps, LEDs or laser diodes), directs light 121 having a first wavelength or range of wavelengths towards the rod amplifier 104. The first wavelength or range of wavelengths of light 121 is selected to be minimally absorbed by either the flow tube 110 or any contained recirculating fluid 118. In response to the directed light 121, the rod amplifier 104 amplifies power of an incoming laser beam 123 having a second wavelength or range of wavelengths. In effect, light from the light pump source 106 provides energy to a gain medium (in this case rod amplifier 104) to amplify power of the incoming laser light. The laser beam 123 passes longitudinally along the rod amplifier before exiting. Some small amount of non-longitudinal or transverse directed (with respect to the longitudinal axis of the rod amplifier 104) laser light 125 having the same second wavelength or range of wavelengths is incidentally created during this process. Commonly known as amplified spontaneous emission (ASE), the laser light 125 is absorbed by the recirculating fluid, with waste heat due to absorption being ultimately transferred to attached chiller or cooler systems.

Figure 1B:
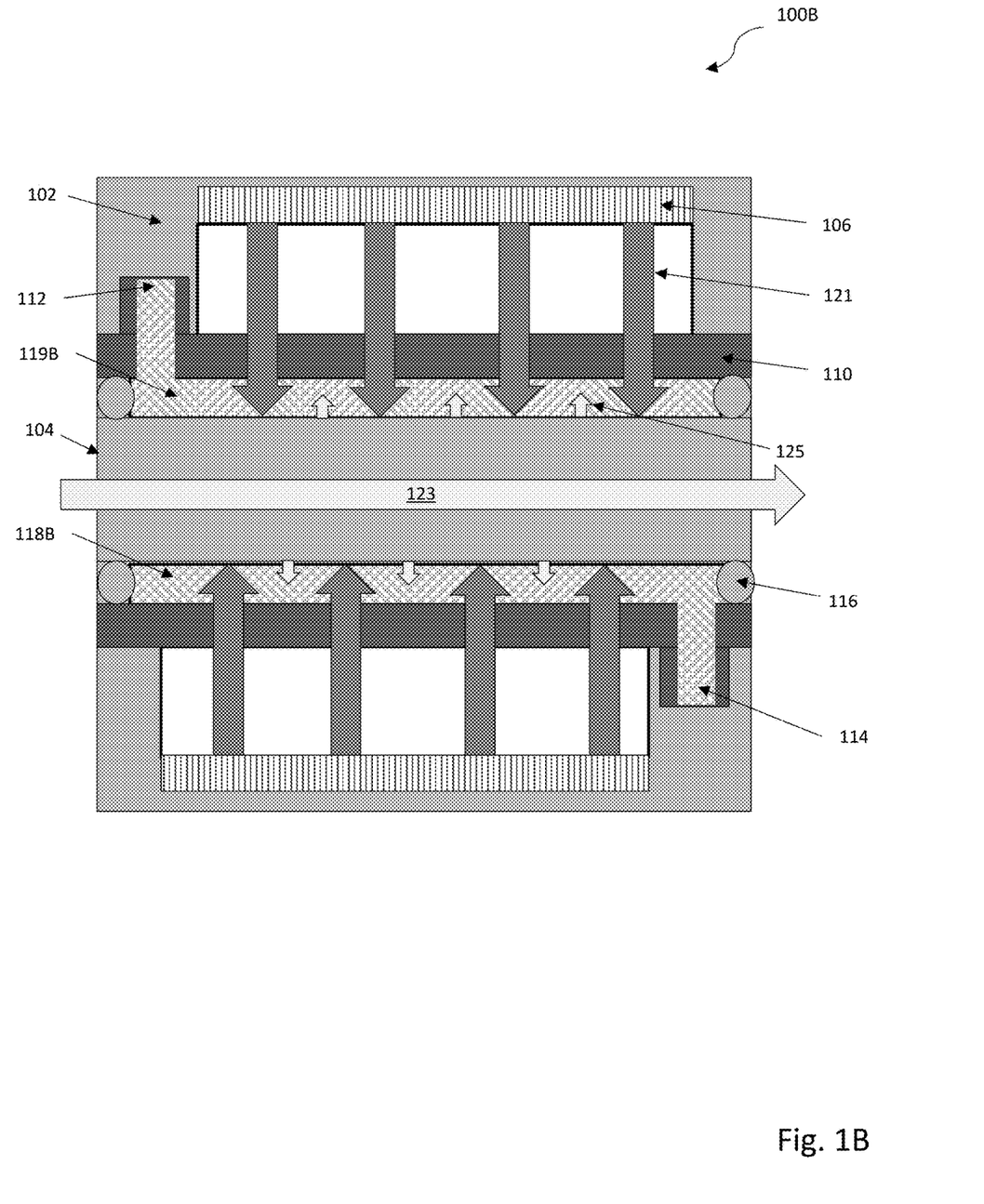
FIG. 1B illustrates a laser amplifier with a flow tube and a contained light absorbing structures.

FIG. 1B illustrates an alternative laser cooling system 100B similar to that discussed with respect to FIG. 1A. In this embodiment however, the flow tube 110 can be filled with a recirculating fluid 118 that does not directly absorb ASE laser light 125. Instead, shaped materials such as spheres, cubes, pyramids, hexagons, pentagons, heptagons, octagons, frits, lattices, overlapping structures, interlocking structures, or other macroscopic open pore light absorbing structures 119B, or regularly or irregularly shaped parts are doped with an absorber material and are used to absorb the ASE laser light 125. In some embodiments, shaped materials can include a solid matrix that incorporates or is formed from light absorbing material. Water or other fluid can flow around and through the absorbing structures or solid matrix 119B, removing waste heat. In some embodiments the structures can be immovably packed or held within a separate container system. In one embodiment, for example, a Nd:YAG rod amplifier could be surrounded with samarium doped glass balls ~0.2-1 mm in diameter that are packed tightly around the rod. Gaps between the spheres serve as micro fluid flow pathways that allow for waste heat removal. Advantageously, the high surface area and small size of the spheres can yield a much higher thermal fracture limit versus standard absorbing flow tubes.

Figure 1C:
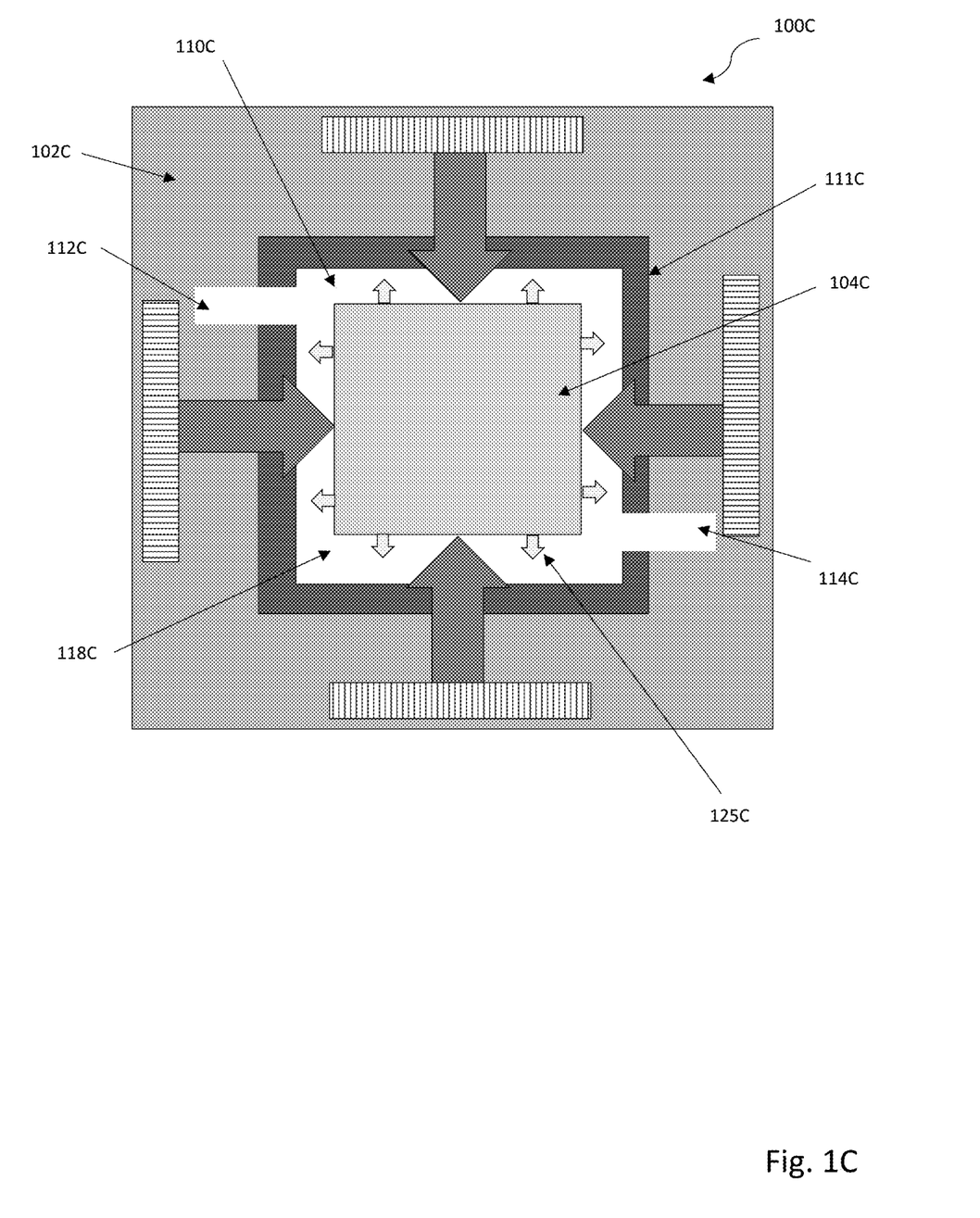
FIG. 1C illustrates a slab amplifier with a flow cavity and additional cladding.

FIG. 1C illustrates an alternative laser cooling system 100C for a slab amplifier similar to that discussed with respect to the rod amplifier of FIGS. 1A and 1B but that does not require a separate flow tube. The system 100C includes an amplifier housing 102C having optional integral or attached light absorbing cladding 111C that at least partially surrounds a slab amplifier 104C. A flow cavity 110C is defined between the slab amplifier 104C and the light absorbing cladding 111C. An inlet 112C and outlet 114C are also defined to allow recirculating fluid 118C into and out of the cavity 110C. As previously described with respect to FIG. 1A, amplified spontaneous emission (ASE) laser light 125C is absorbed by cladding.

Figure 1D:
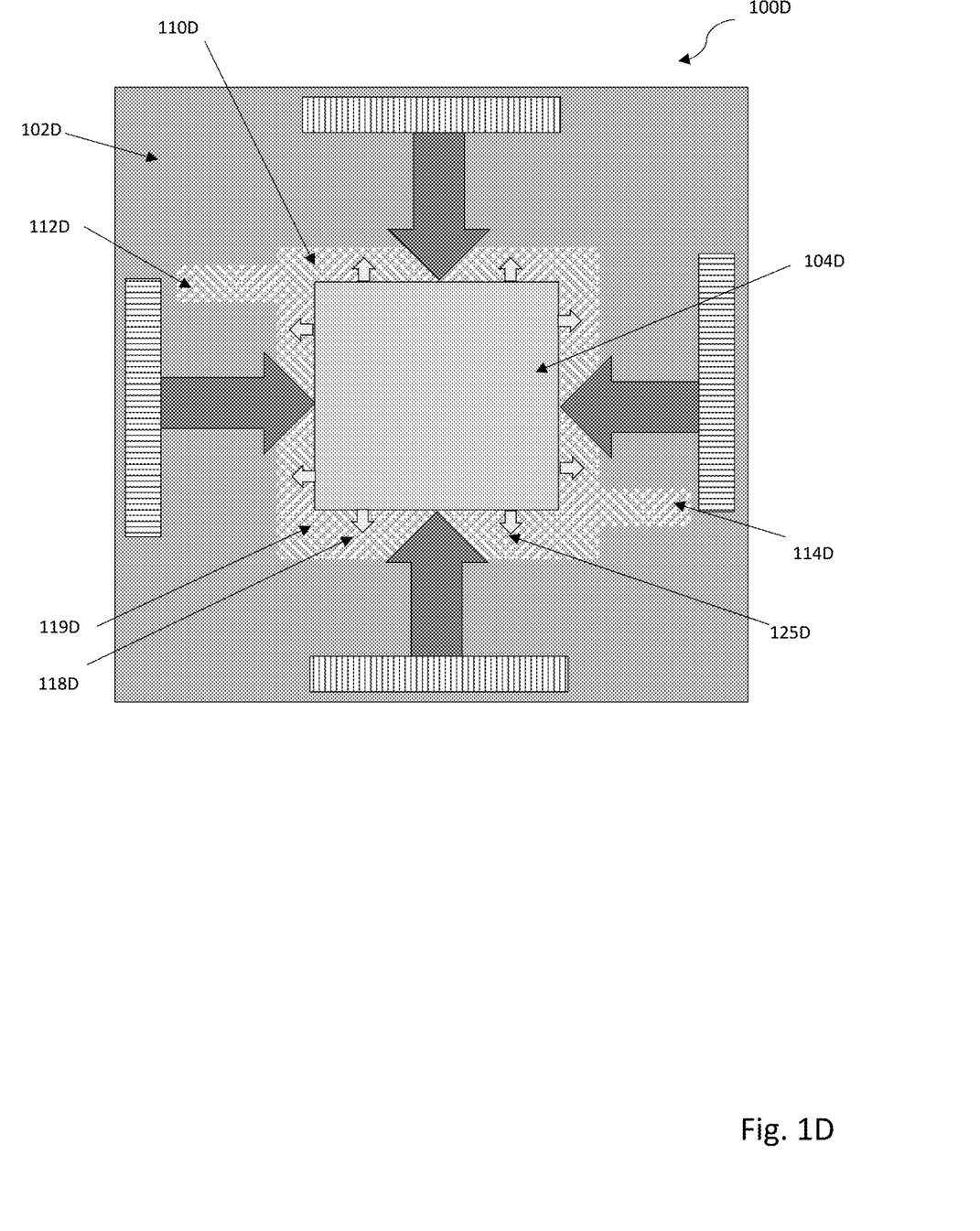
FIG. 1D illustrates a slab amplifier with a flow cavity and contained light absorbing structures.

FIG. 1D illustrates an alternative laser cooling system 100C for a slab amplifier similar to that discussed with respect to the rod amplifier of FIG. 1B. This embodiment does not require a separate flow tube and can instead use a flow cavity such as described with respect to FIG. 1C. The system 100D includes an amplifier housing 102D that at least partially surrounds a slab amplifier 104D. A flow cavity 110D is defined between the slab amplifier 104C and the amplifier housing 102D, and an inlet 112D and outlet 114D are also defined to allow recirculating fluid 118D into and out of the cavity 110D. The flow cavity can be filled with shaped material such as spheres, frits, lattice structure, or other macroscopic open pore light absorbing structures 119D that are doped with absorber material such as samarium or copper and are used to absorb the ASE laser light 125D. Water or other recirculating fluid 118D can flow around and through the absorbing structures 119B, removing waste heat. Generally the recirculating fluid should be index matched to the shaped material.

Figure 1E:
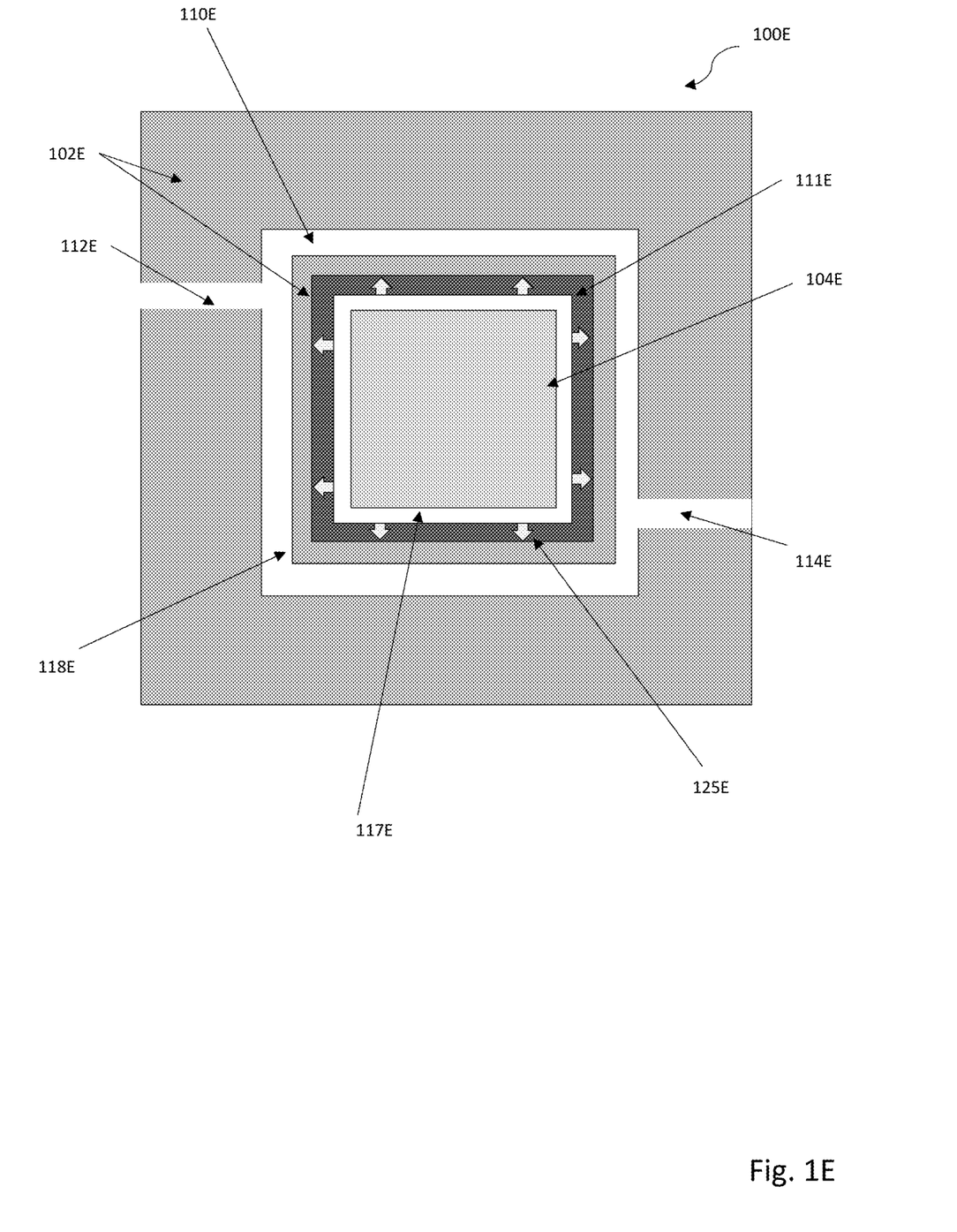
FIG. 1E illustrates a slab amplifier with additional cladding in a solid state configuration

FIG. 1E illustrates an alternative solid state laser cooling system 100E for a slab amplifier similar to that discussed with respect to the slab amplifier of FIG. 1C. System 100E can operate as a liquid or solid state ASE absorbing system that can be used alone or in combination with liquid cooled systems such as discussed herein. In some operational modes, the system described in FIG. 1E can be operated without filling flow channels 110E, 112E and 114E with liquid. In other embodiments, the flow channels can be omitted from the system, to make amplifier housing 102E a continuous solid. Heat removal from the cladding is then achieved by face cooling of the amplifier housing 102E and amplifier slab 104E by a fluid such as water, silicone oil, or gases such as air, helium, or argon. Heat conducts from the cladding interface to the housing and from there to the face of the housing where it is cooled. The system 100E includes an amplifier housing 102E having optional integral or attached light absorbing cladding 111E that fully surrounds a slab amplifier 104E. This cladding can include ASE absorbing materials such as described in this disclosure, including copper or samarium doped materials in the form of solid state materials like glasses or crystals. The cladding can also be a low reflectance black coating such as lampblack, Actar black, tungsten black, carbon velvet black, or pyrolytic graphite. This cladding material is adhered to the amplifier housing with conductive epoxy or solder to facilitate heatsinking. The slab amplifier 104E can be mounted in the housing by means of a potting compound or glue 117E. This potting compound or glue can be transmissive to the ASE signal and can be refractive index matched, as closely as possible, to the amplifier slab 104E and the cladding to minimize reflections from the interfaces. The potting compound or glue can also be compliant to allow expansion and temperature mismatch between the slab and cladding to survive. Examples of useful potting compounds include optical cements such as Norland optical cement or transparent urethanes developed for this purpose. In those embodiments that use flowing liquid as a coolant, a flow cavity 110E is defined within the amplifier housing 102E to facilitate removal of heat. An inlet 112E and outlet 114E are also defined to allow recirculating fluid 118E into and out of the cavity 110E. As previously described with respect to FIG. 1C, amplified spontaneous emission (ASE) laser light 125E is absorbed by cladding.

In the described or other embodiments, a gain medium for a laser amplifier can be based on Neodymium, Ytterbium, or Erbium doped rods or slabs of materials such as $Y_3AL_5O_{12}$ (YAG), $YLiF_4$ (YLF), $YVO_4$, glass, $GdVO_4$, $Gd_3Ga_5O_{12}$ (GGG), $KGd(WO_4)_2$ (KGW), $YAlO_3$ (YALO), $YAlO_3$ (YAP), $LaSc_3(BO_3)_4$ (LSB), $Sr_5(PO_4)_3F$ (S-FAP), or $Lu_2O_3$, $Y_2O_3$.

In the described or other embodiments, narrow wavelength light absorbing and recirculating fluids or structures can include light absorbing salts such samarium nitrate or samarium chloride. Samarium salts have a narrow absorption in the 1-micron regime and still allow transmission in common light pump source wavelengths. Samarium salts are generally soluble in aqueous coolants such as water, can be put into solution or embedded in glass or nanoparticles. Alternatively, quantum dots suspended in a colloidal solution can be used as a light absorber. For example, silicon quantum dots can be tuned across the visible spectrum. With a change in materials to germanium or cadmium telluride, infrared narrow bandwidth absorption can be supported. As an alternative, dyes or other organic materials in solution or colloidal suspension can be used.

In the described or other embodiments, recirculating fluid able to hold salts in solution or remove waste heat can include water, water and anticorrosives such as Optishield®, ethylene or propylene glycol, alcohols, Fluorinert® or similar fluorine based cooling fluids, and siloxanes (silicone oils)). In yet another alternative, non-aqueous fluids or ionic fluids can be used as a recirculating coolant fluid.

In one embodiment, thulium doped materials such as $Y_3AL_5O_{12}$ (YAG), $YLiF_4$ (YLF), $YVO_4$, glass, $GdVO_4$, Gd3Ga5O12 (GGG), $KGd(WO_4)_2$ (KGW), $YAlO_3$ (YALO), $YAlO_3$ (YAP), $LaSc_3(BO_3)_4$ (LSB), $Sr_5(PO_4)_3F$ (S-FAP), or $Lu_2O_3$, $Y_2O_3$ which emit in the 2 micron spectral regime, praseodymium doped fluids (which can absorb at 2 microns but transmit in the 800 nm regime where they are typically diode pumped). For transition metal lasers like Ti:sapphire and Cr:LiSAF which absorb in the visible (400-700 nm) and lase in the NIR (700-1100), copper based salts like copper sulfate, copper nitrate, copper chloride can be used.

The embodiments discussed with respect to FIGS. 1A, 1B, 1C, and 1D allow power scaling of laser amplifiers significantly beyond the limits defined by the thermal fracture or damage of solid-state absorbing materials used for the edge cladding or flow tubes. The thermal power is instead absorbed directly into the recirculating fluid where the heat capacity of the fluid and flow rate can be used to engineer extremely high average power with little thermal load on the flow tube or housing. Since the flow tube and housing can be transparent to the pump and laser wavelength and do not absorb any significant power. The only heating of these components comes from the small temperature rise in the fluid coolant under average power operation. This eliminates the potential for catastrophic damage due to the edge cladding absorption and enables much higher average power capability of the amplifier. In effect, if a rod-based system has a repetition rate (average power) limit due to flow tube fracture, then the limit will no longer be that of the relatively fragile flow tube but rather the amplifier rod, enabling higher repetition rate capability of the system.

Typically, absorber material and laser amplifier will operate best if the absorption is optimized for the particular conditions of each laser amplifier and this invention makes tuning this system flexible and adaptable. Solid state absorbers must be fabricated and as such are subject to errors in doping, thickness, surface finish, etc. which can negatively impact the performance causing the edge cladding to run hot or cause parasitic loss in the amplifier. Typically, an absorber will absorb the inverse of the transverse gain (which can be >99% of the emission) and maintain an operating temperature which keeps the amplifier in peak performance. Since parasitic losses typically occur as laser amplifier temperature increases, it is best to keep temperature low. By changing the concentration of the absorber and flow rate of the coolant, the light absorption can be distributed across the flow channel, with absorption set to be just strong enough to inhibit parasitic lasing while removing the thermal load needed to keep the surface temperature of the amplifier near room temperature.

It should be noted that the physical hardware of the amplifier need not be changed to take advantage of this invention. For example, conventional and commonly available flow tubes having light absorbing dopants to absorb laser light and transmit pump light can still be used. Using the described light absorbing fluid or structures ensures that ASE or other laser radiation is absorbed before contacting the flow tube.

In some embodiments, use of an edge cladding or ASE light absorbing fluid that can transmit the pump light is not required. For example, amplifier rods can receive pump light along the laser beam entrance or exit surfaces, or slab amplifiers can be pumped through a large extraction face. Since the pump light does not need to be transmitted through the recirculating light absorbing fluid, use of a larger variety of light absorbing salts is supported. For example, copper or iron salt based coolants that absorb efficiently between 700 and 1200 nm (common in widely available laser materials) can be used. Other absorbing materials can include titanium doped $Al_2O_3$ (Ti:sapphire), Chromium doped $LiSrAlF_6$ (Cr:LiSAF), ytterbium doped materials, and neodymium doped materials. Ethanol can be used to absorb 1.5 micron laser emission of erbium based laser amplifiers.

Figure 2:
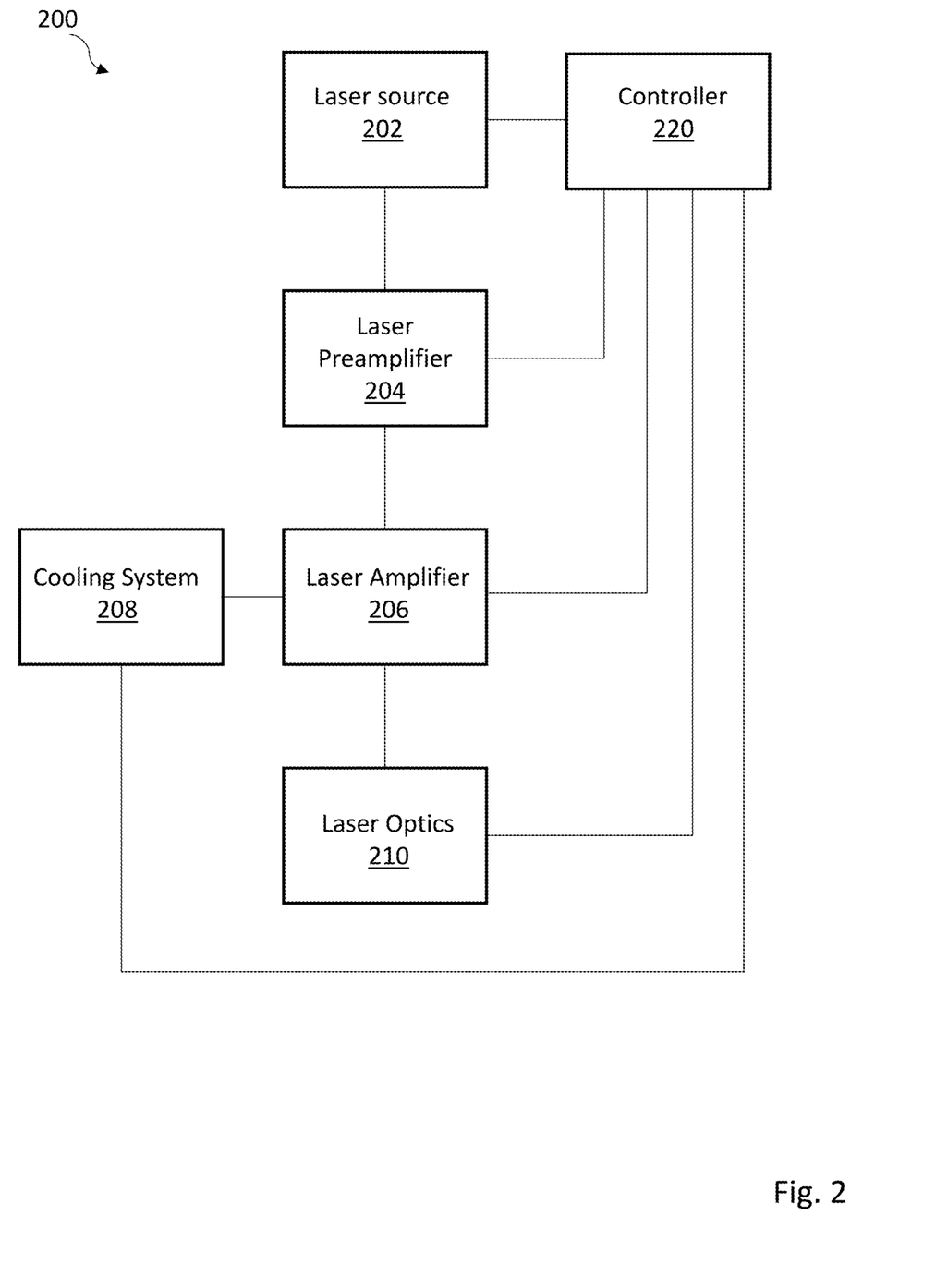
FIG. 2 illustrates a laser system including a cooled amplifier.

FIG. 2 illustrates one embodiment of a laser system 200 that supports the embodiments discussed with respect to FIGS. 1A, 1B, 1C, and 1D. FIG. 2 illustrates a laser source 202 directing light through an optional laser preamplifier 204 to a laser amplifier 206. The laser amplifier 206 is connected to a cooling system 208, and amplified light can be transmitted for final shaping and guiding by laser optics 210. The system is controlled by a controller 220 that can be connected to control any components of the laser cooling system. The controller 220 and any included processors can be connected to variety of sensors, actuators, heating or cooling systems, monitors, or other external controllers as needed to coordinate operation. A wide range of sensors, including imagers, light intensity monitors, thermal, pressure, or gas sensors can be used to provide information used in control or monitoring. The controller 220 can be a single central controller, or alternatively, can include one or more independent control systems. The controller 220 can be provided with an interface to allow input of instructions. Use of a wide range of sensors allows various feedback control mechanisms that improve quality, manufacturing throughput, and energy efficiency.

In some embodiments, the laser source 202 of FIG. 2 can be constructed as a continuous or pulsed laser. In other embodiments the laser source 202 includes a pulse electrical signal source such as an arbitrary waveform generator or equivalent acting on a continuous-laser-source such as a laser diode. In some embodiments this could also be accomplished via a fiber laser or fiber launched laser source which is then modulated by an acousto-optic or electro optic modulator. In some embodiments a high repetition rate pulsed source which uses a Pockels cell can be used to create an arbitrary length pulse train.

Possible laser types include, but are not limited to: Gas Lasers, Chemical Lasers, Dye Lasers, Metal Vapor Lasers, Solid State Lasers (e.g. fiber), Semiconductor (e.g. diode) Lasers, Free electron laser, Gas dynamic laser, "Nickel-like" Samarium laser, Raman laser, or Nuclear pumped laser.

A Gas Laser can include lasers such as a Helium-neon laser, Argon laser, Krypton laser, Xenon ion laser, Nitrogen laser, Carbon dioxide laser, Carbon monoxide laser or Excimer laser.

A Chemical laser can include lasers such as a Hydrogen fluoride laser, Deuterium fluoride laser, COIL (Chemical oxygen-iodine laser), or Agil (all gas-phase iodine laser).

A Metal Vapor Laser can include lasers such as a Helium-cadmium (HeCd) metal-vapor laser, Helium-mercury (HeHg) metal-vapor laser, Helium-selenium (HeSe) metal-vapor laser, Helium-silver (HeAg) metal-vapor laser, Strontium Vapor Laser, Neon-copper (NeCu) metal-vapor laser, Copper vapor laser, Gold vapor laser, or Manganese (Mn/$MnCl_2$) vapor laser. Rubidium or other alkali metal vapor lasers can also be used. A Solid State Laser can include lasers such as a Ruby laser, Nd:YAG laser, NdCrYAG laser, Er:YAG laser, Neodymium YLF (Nd:YLF) solid-state laser, Neodymium doped Yttrium orthovanadate(Nd:$YVO_4$) laser, Neodymium doped yttrium calcium oxoborate Nd:$YCa_4O(BO_3)^3$ or simply Nd:YCOB, Neodymium glass (Nd:Glass) laser, Titanium sapphire(Ti:sapphire) laser, Thulium YAG (Tm:YAG) laser, Ytterbium YAG (Yb:YAG) laser, Ytterbium:$2O_3$ (glass or ceramics) laser, Ytterbium doped glass laser (rod, plate/chip, and fiber), Holmium YAG (Ho:YAG) laser, Chromium ZnSe (Cr:ZnSe) laser, Cerium doped lithium strontium (or calcium)aluminum fluoride(Ce:LiSAF, Ce:LiCAF), Promethium 147 doped phosphate glass (147 $Pm^{+3}$:Glass) solid-state laser, Chromium doped chrysoberyl (alexandrite) laser, Erbium doped and Erbium-ytterbium co-doped glass lasers, Trivalent uranium doped calcium fluoride (U:$CaF_2$) solid-state laser, Divalent samarium doped calcium fluoride (Sm:$CaF_2$) laser, or F-Center laser.

A Semiconductor Laser can include laser medium types such as GaN, InGaN, AlGaInP, AlGaAs, InGaAsP, GaInP, InGaAs, InGaAsO, GaInAsSb, lead salt, Vertical cavity surface emitting laser (VCSEL), Quantum cascade laser, Hybrid silicon laser, or combinations thereof.

In some embodiments, various laser pre-amplifiers 204 are optionally used to provide high gain to the laser signal, while optical modulators and isolators can be distributed throughout the system to reduce or avoid optical damage, improve signal contrast, and prevent damage to lower energy portions of the system 200. Optical modulators and isolators can include, but are not limited to Pockels cells, Faraday rotators, Faraday isolators, acousto-optic reflectors, or volume Bragg gratings. Laser pre-amplifier 204 could be diode pumped or flash lamp pumped pre-amplifiers and configured in single and/or multi-pass or cavity type architectures. As will be appreciated, the term laser pre-amplifier here is used to designate amplifiers which are not limited thermally (i.e. they are smaller) versus laser amplifiers 206 (larger). As compared to laser-pre-amplifiers, laser amplifiers will typically be positioned to be one of the final units in a laser system 200 and will be most likely susceptible to thermal damage, including but not limited to thermal fracture or excessive thermal lensing.

Laser pre-amplifiers 204 can include single pass laser pre-amplifiers usable in systems not overly concerned with energy efficiency. For more energy efficient systems, multipass pre-amplifiers can be configured to extract much of the energy from each laser pre-amplifier 204 before going to the next stage. The number of laser pre-amplifiers needed for a particular system is defined by system requirements and the stored energy/gain available in each amplifier module. Multipass pre-amplification can be accomplished through angular multiplexing or polarization switching (e.g. using waveplates or Faraday rotators).

Alternatively, laser pre-amplifiers 204 can include cavity structures with a regenerative amplifier type configuration. While such cavity structures can limit the maximum pulse length due to typical mechanical considerations (length of cavity), in some embodiments "White cell" cavities can be used. A White cell is a multipass cavity architecture in which a small angular deviation is added to each pass. By providing an entrance and exit pathway, such a cavity can be designed to have extremely large number of passes between entrance and exit allowing for large gain and efficient use of the amplifier. One example of a White cell would be a confocal cavity with beams injected slightly off axis and mirrors tilted such that the reflections create a ring pattern on the mirror after many passes. By adjusting the injection and mirror angles the number of passes can be changed.

Laser amplifier 206 are also used to provide enough stored energy to meet system energy requirements, while supporting sufficient thermal management to enable operation at system required repetition rate whether they are diode or flashlamp pumped.

Laser amplifier 206 can be configured in single and/or multi-pass or cavity type architectures. Similar to laser pre-amplifiers, laser amplifier 206 can include single pass amplifiers usable in systems not overly concerned with energy efficiency. For more energy efficient systems, multipass laser amplifiers can be configured to extract much of the energy from each amplifier before going to the next stage. The number of laser amplifiers needed for a particular system is defined by system requirements and the stored energy/gain available in each amplifier module. Multipass laser amplification can be accomplished through angular multiplexing, or polarization switching (using e.g. waveplates or Faraday rotators).

Alternatively, laser amplifier 206 can include cavity structures with a regenerative amplifier type configuration. As discussed with respect to laser pre-amplifiers 204, amplifiers 206 can be used for power amplification.

In some embodiments, the cooling systems 208 can include passive or active fluid pumping systems. Sensors can be used by controller 220 to determine light transmission or laser light absorption characteristics. In some embodiments, waste heat can be used to increase temperature of connected components.

As will be appreciated, laser flux and energy can be scaled in this architecture by adding more pre-amplifiers and amplifiers with appropriate thermal management and optical isolation. Adjustments to heat removal characteristics of the cooling system are possible, with increase in pump rate or changing cooling efficiency being used to adjust performance.

The laser beam can be shaped by a great variety of laser optics 210 to combine, focus, diverge, reflect, refract, homogenize, adjust intensity, adjust frequency, or otherwise shape and direct one or more laser beams. In one embodiment, multiple light beams, each having a distinct light wavelength, can be combined using wavelength selective mirrors (e.g. dichroics) or diffractive elements. In other embodiments, multiple beams can be homogenized or combined using multifaceted mirrors, microlenses, and refractive or diffractive optical elements.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A laser amplifier, comprising:
a light pump source configured to generate light at a first wavelength or range of wavelengths;
an optically pumped laser amplifier having a gain medium that amplifies light at a second wavelength or range of wavelengths in response to receiving the generated light from the light pump source; and
a light absorbing cladding that at least partially surrounds the gain medium and forms a flow cavity between the gain medium and the light absorbing cladding that holds a coolant fluid and a solid matrix comprising a plurality of glass balls,
wherein the light absorbing cladding forming the flow cavity and the solid matrix absorbs light at the second wavelength or range of wavelengths from the optically pumped laser amplifier, and the coolant fluid flow through the solid matrix to remove waste heat from at least one of the solid matrix, the gain medium, and the light absorbing cladding.

2. The laser amplifier of claim 1, wherein the light absorbing cladding that at least partially surrounds the gain medium further forms an inlet and an outlet with the gain medium for the coolant fluid to move into and out of the flow cavity.

3. The laser amplifier of claim 1, wherein the gain medium comprises a slab amplifier.

4. The laser amplifier of claim 1, wherein the gain medium comprises a Nd:YAG rod and the coolant fluid can absorb 1064 nm laser emission.

5. The laser amplifier of claim 1, wherein the gain medium comprises a Nd:YLF rod and the coolant fluid can absorb at least one of 1047 or 1053 nm laser emission.

6. The laser amplifier of claim 1, wherein the coolant fluid transmits light at the first wavelength or the first range of wavelengths from the light pump source.

7. The laser amplifier of claim 1, wherein the coolant fluid comprises an aqueous salt solution.

8. The laser amplifier of claim 1, wherein the coolant fluid comprises an aqueous salt solution with at least one of samarium chloride, samarium nitrate, samarium sulfate, copper nitrate, copper sulfate, or copper chloride.

9. The laser amplifier of claim 1, wherein the light absorbing cladding is a part of a housing for the optically pumped laser amplifier.

10. The laser amplifier of claim 1, wherein the flow cavity further holds a light absorbing structure that absorbs the light at the second wavelength or range of wavelengths.

11. The laser amplifier of claim 1, wherein the coolant fluid further absorbs the light at the second wavelength or range of wavelengths.

12. A method of operating a laser system, comprising:
providing a light pump source that generates light at a first wavelength or range of wavelengths;
providing an optically pumped laser amplifier having a gain medium that amplifies light at a second wavelength or range of wavelengths in response to receiving the generated light from the light pump source;
providing a light absorbing cladding that at least partially surrounds the gain medium to form a flow cavity between the gain medium and the light absorbing cladding that holds a coolant fluid and a solid matrix comprising a plurality of glass balls, wherein the light absorbing cladding forming the flow cavity and the solid matrix absorbs light at the second wavelength or range of wavelengths from the optically pumped laser amplifier; and
circulating the coolant fluid through the solid matrix to remove waste heat from at least one of the solid matrix, the gain medium, and the light absorbing cladding.

13. The method of operating a laser system of 12, wherein the gain medium comprises a slab amplifier.

14. The method of operating a laser system of 12, wherein the coolant fluid comprises an aqueous salt solution.

15. The method of operating a laser system of 12, wherein the coolant fluid comprises an aqueous salt solution with at least one of samarium chloride, samarium nitrate, samarium sulfate, copper nitrate, copper sulfate, or copper chloride.

16. A laser amplifier, comprising:
a light pump source configured to generate light at a first wavelength or range of wavelengths;
an optically pumped laser amplifier having a gain medium that amplifies light at a second wavelength or range of wavelengths in response to receiving the generated light from the light pump source; and
a housing configured to at least partially surround the gain medium and hold a solid matrix that absorbs the second wavelength or range of wavelengths, with the solid matrix cooled by a coolant fluid,
wherein the solid matrix comprises a plurality of glass balls.

17. The laser amplifier of claim 16, wherein the solid matrix comprises a material doped with samarium or copper.

18. A method of operating a laser system, comprising:
providing a light pump source that generates light at a first wavelength or range of wavelengths;
providing an optically pumped laser amplifier having a gain medium that amplifies light at a second wavelength or range of wavelengths in response to receiving the generated light from the light pump source; and
circulating a cooling fluid in a housing that holds a solid matrix and at least partially surrounds the gain medium, with the coolant fluid selected to absorb the second wavelength or range of wavelengths,
wherein the solid matrix comprises a plurality of glass balls.

19. The method of operating a laser system of claim 18, wherein the solid matrix comprises a material doped with samarium or copper.

\* \* \* \* \*